April 12, 1932.   D. ELDER   1,853,805
IRRIGATING APPARATUS
Filed Sept. 26, 1928
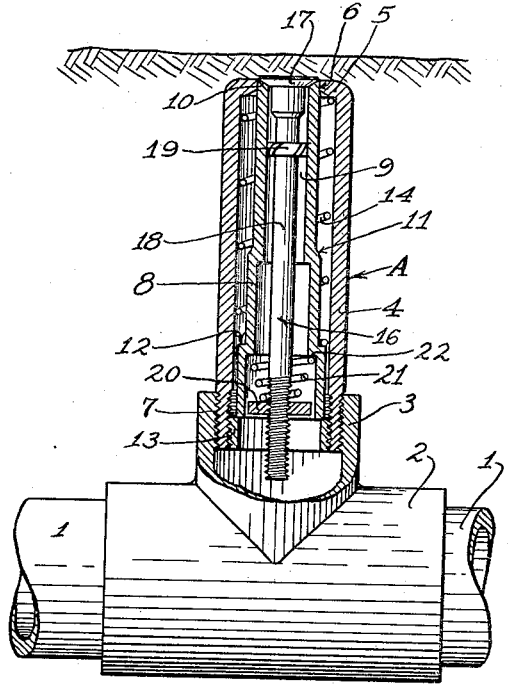
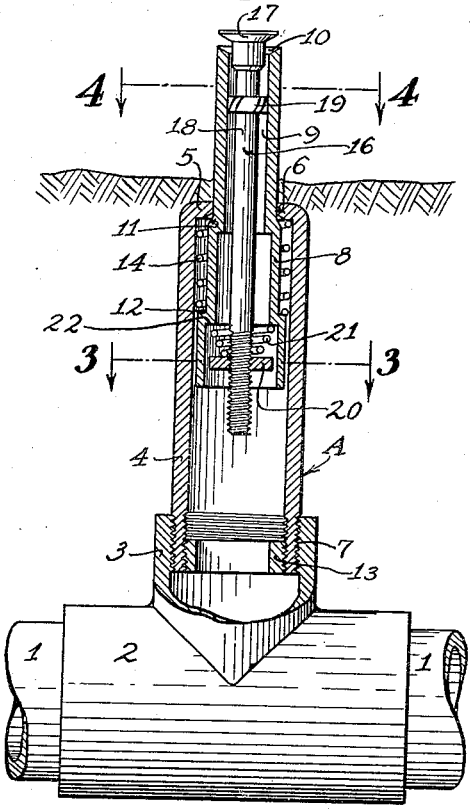
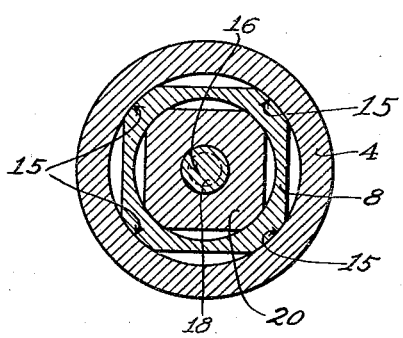
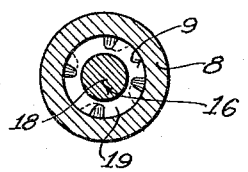
INVENTOR.
Donald Elder
BY Harry A. Totten
ATTORNEYS.

Patented Apr. 12, 1932

1,853,805

UNITED STATES PATENT OFFICE

DONALD ELDER, OF SAN FRANCISCO, CALIFORNIA

IRRIGATING APPARATUS

Application filed September 26, 1928. Serial No. 308,432.

This invention relates to improvements in irrigating devices and more particularly to a sprinkler head for spraying systems.

The object of the invention is to provide a pressure actuated telescopic nozzle adapted to project when in operation above the ground line and the spray valve of which is pressure operated to open and close while the nozzle is projected above the ground line.

Another object is to provide a structure wherein the nozzle is closed prior to returning to its normal position below the surface of the ground, overcoming the liability of foreign material entering the same. A further object is to provide a structure wherein the operative movement of the nozzle and valve may be varied by interchanging the tensioning device or varying the operating pressure thereon. To provide a nozzle which when in operation will project above the ground line, and in this manner discharge the water at a point where its flow is unobstructed by grass or like vegetation, and whereby a larger irrigating area is possible than when the nozzles are flush with or below the ground line.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings disclosing the preferred embodiment of my invention:—

Fig. 1 is a view in vertical section of a sprinkler head in its normal or lowered position.

Fig. 2 is a similar view with the nozzle projected above the ground line and with the spray valve open.

Fig. 3 is a sectional view on line 3—3 of Fig. 2.

Fig. 4 is a similar view on line 4—4 of Fig. 2.

In the drawings, 1 indicates a water supply line or pipe buried a few inches below the surface of the ground shown crosshatched above, and in which pipe is positioned a T 2. In the lateral branch of the T which is upwardly extended as at 3, is threaded a sprinkler head A. This head consists of a tubular cylindrical casing 4, flanged at its upper end at 5 and provided with an aperture 6. The lower end of the casing 4 is threaded at 7 into the member 3. Telescopically mounted within the casing 4 is a cylindrical nozzle 8, having a tubular open ended bore 9, the upper end of which is circumferentially beveled at 10. Approximately midway of its length, the outer surface of the nozzle is formed with a stop shoulder 11, and near its lower end is formed with a second shoulder 12. A ring 13 threaded into the lower end of the nozzle 8 affords an abutment for precluding the movement of the nozzle downwardly through the casing 4. Coiled about the nozzle 8 is a spring 14, the upper end of which bears on the under side of flange 5 and the lower end on shoulder 12, the action of the spring being to telescope the nozzle inwardly into the casing 4 with the inner end of the nozzle abutting ring 13 and the outer end of the nozzle flush with the surface of the flange 5. The lower end of the nozzle 8 is polygonal in cross section affording bearing surfaces 15 for contacting with the inner wall surface of the casing 4 to guide the lower end of the nozzle 8 in its movement longitudinally within the casing.

Disposed concentrically within the nozzle 8 is a spray valve 16 having a mushroom head 17 adapted to seat on the beveled end 10 of the nozzle 8. Near its upper end, the stem 18 of the valve is provided with a spirally grooved circumferential flange 19 which affords a guide for the stem, and the grooves of which afford a means for imparting a swirl to the water as the same approaches the discharge end of the nozzle. To the lower end of the stem is threaded a polygonal nut 20 against which abuts a spring 21, its upper end bearing on the flange 22 of the nozzle 8. The nut is of a size to contact at points with the inner wall surface of the nozzle and affords a guide for the lower end of the spray valve, the spring causing the valve to seat as hereinafter described.

With the parts assembled as in the drawings, it is understood that the spring 14 operates under less pressure than does the spring 21; therefore, on the admittance of water under pressure into the pipe 1, the action thereof will be to first force the nozzle 8 outwardly from the upper end of the casing from its position in Fig. 1 to that in Fig. 2. As the stop 11 contacts with the under surface of flange 5, the accumulated water pressure within the casing is sufficient to act on the exposed areas of the valve elements and cause an unseating of the mushroom head 17 of the valve 16 enabling the water to spray from the end of the nozzle, thus the spray does not tear up the sod or scatter the surrounding earth during the rising of the nozzle as the construction prevents the ejection of water until the nozzle is elevated to its full height above the ground. Uniformity of spray is ensured by the passages or channels in the flange 19. On the shutting off of the water pressure in the pipe 1, the tension of spring 21 is such that it will cause the mushroom head 17 to seat prior to the action of spring 14 retracting the nozzle 8 and thus prevent tearing up of grass etc. during the descent of the nozzle into the earth. The nozzle is set just below the surface of the earth or sod as shown in Fig. 1 and works up and down through a small hole which it will by its own motion always keep clear, and attention is called to the fact that the rising nozzle is of uniform diameter without lateral obstructions or extending head so that it is always free to be retracted into the soil and cannot entrap earth, stones or grass on its way down, otherwise it might not go all the way back and cause an accident to people walking about a lawn where the nozzles were installed.

An important feature of the invention is the construction whereby any accumulation of dirt within may be blown out by simply unscrewing the valve 17 while the water pressure is on. The lower end of the stem is threaded for a relatively long distance extending through the nut so that the twirling flange device 19 may be drawn entirely out of the nozzle for blowing out accumulations, yet without losing the nut 20.

I claim:—

1. A rising and falling telescopic sprinkler head comprising a tubular casing open at one end and provided with a water inlet, a tubular nozzle telescopically mounted therein for projection outwardly from the open end of the casing and open at one end affording a discharge, the projecting portion of said nozzle having a uniform exterior diameter throughout its length whereby it may be retracted without interference with foreign matter, a valve telescopically mounted within the nozzle and provided with a head for controlling the passage of water from the discharge end, means for normally maintaining the nozzle retracted within the casing, and means for normally maintaining the valve seated to close the end of the nozzle, said means adapted for operation from their normal position by water under pressure admitted into said casing.

2. A sprinkler head comprising a tubular casing open at one end and provided with a water inlet, a tubular nozzle telescopically mounted therein for projection outwardly from the open end of the casing and open at one end affording a discharge, a valve telescopically mounted within the nozzle and provided with a head for controlling the passage of water from the discharge end, a spring normally maintaining the nozzle retracted within the casing, and a spring normally maintaining the valve seated to close the end of the nozzle, the springs affording different resisting pressures to the water pressure within said casing, the nozzle retracting spring yielding first and said valve seating means yielding secondly on the admittance of water under pressure into the casing and operating inversely on the release of said water pressure.

3. A sprinkler comprising a tubular casing open at one end and provided with a water inlet, a tubular nozzle open at its ends and telescopically mounted within the casing for projection at one end outwardly from the open end of the casing, a valve mounted for lineal movement within the nozzle and provided with a head for seating to close the outer end of the nozzle, and means for automatically closing said valve and retracting said tubular nozzle into the casing, the arrangement being such that upon admission of water under pressure to the sprinkler said nozzle will first be projected from the casing and the valve opened after the nozzle is extended.

4. A telescopic rising and falling sprinkler head comprising a tubular casing, a tubular nozzle telepscopically mounted within the casing for projection outwardly at one end of the casing, a valve closing the outer end of the nozzle provided with a stem extending down into the nozzle and threaded at its lower end provided with a nut lying within the casing, a water stream modifying spiral device secured to said stem below said valve within the bore of the nozzle, the threaded portion of the stem being relatively long for unscrewing from the nut by turning the valve at the outer end for completely withdrawing said spiral device from the outer end of the nozzle while still engaging the nut.

In testimony whereof I have signed my name to this specification.

DONALD ELDER.